United States Patent [19]

Nercessian

[11] 4,054,831
[45] Oct. 18, 1977

[54] POWER SUPPLY TURN-ON AND TURN-OFF TRANSIENT ELIMINATION CIRCUITS

[75] Inventor: Sarkis Nercessian, Flushing, N.Y.

[73] Assignee: Forbro Design Corporation, New York, N.Y.

[21] Appl. No.: 664,957

[22] Filed: Mar. 8, 1976

[51] Int. Cl.² ............................................. G05F 1/16
[52] U.S. Cl. ................................ 323/22 V; 315/107; 315/307; 315/DIG. 7; 323/41; 361/18; 363/115
[58] Field of Search ................. 323/22 V, 17, 19, 38, 323/41; 321/37; 328/267; 315/106, 107, 307, DIG. 7; 361/18, 111

[56] References Cited

U.S. PATENT DOCUMENTS

| | | | |
|---|---|---|---|
| 2,024,953 | 12/1935 | Stone | 321/37 |
| 2,377,370 | 6/1945 | Potter et al. | 323/17 |
| 2,414,122 | 1/1947 | Potter | 323/22 V |
| 2,490,063 | 12/1949 | Kinsell | 323/22 V |
| 2,554,837 | 5/1951 | Meszaros | 321/37 |
| 2,624,039 | 12/1952 | Jorgensen | 323/22 V |

*Primary Examiner*—Gerald Goldberg
*Attorney, Agent, or Firm*—Alfred W. Barber

[57] ABSTRACT

Power supply turn-on and turn-off transients are eliminated in power supplies employing thermionic vacuum tube pass devices and control amplifiers for controlling the output voltage of the power supply by controlling the conductance of the pass tube or tubes. The elimination of turn-on transients is accomplished by cutting off the pass tube and rendering the control amplifier non-responsive for a predetermined time after the power supply is turned on. The turn-off transients are eliminated by quickly restoring the cut-off of the pass tube and the non-responsive rendering means of the control amplifier very quickly after the turn-off instant of the power supply.

4 Claims, 4 Drawing Figures

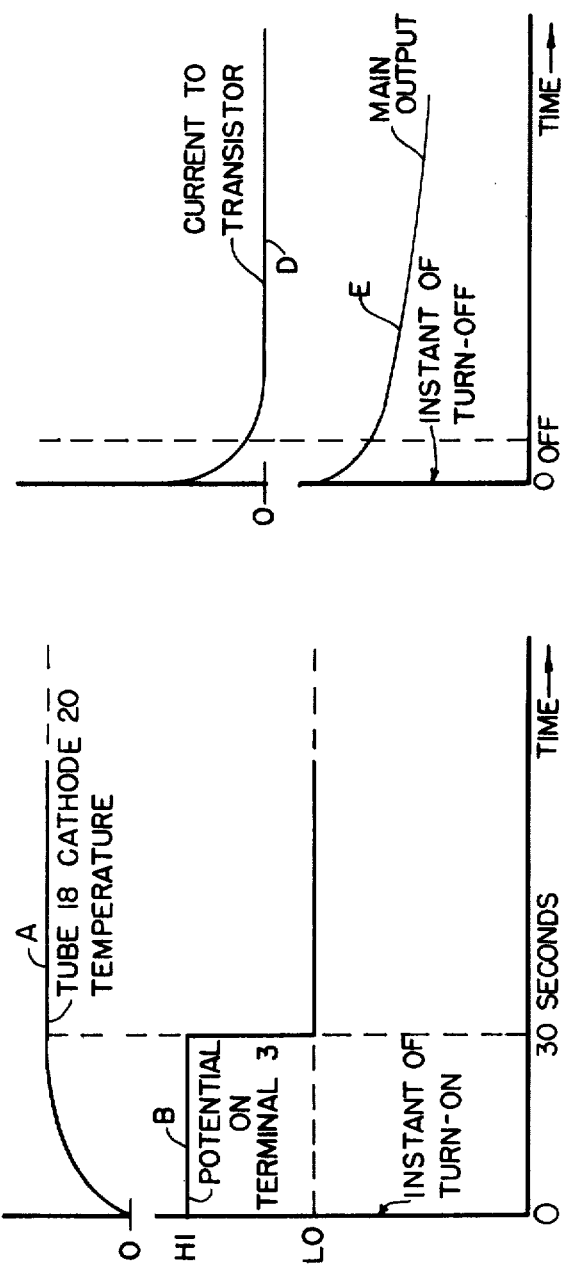

ized and requiring no warm up time, calls for full
POWER SUPPLY TURN-ON AND TURN-OFF TRANSIENT ELIMINATION CIRCUITS High voltage regulated power supplies often use vacuum tube pass devices along with transistorized control circuits. The relatively slow response of the heater-cathode of the vacuum tube can cause transients in the output both at turn-on and turn-off. The turn-on transient is generally caused by the control amplifier calling for more output since before the pass tube heaters bring the cathodes up to emitting temperature, there is no output voltage and the control amplifier, being transistorized and requiring no warm up time, calls for full output. As the tube cathode starts to emit, the output voltage surges upward causing a transient over-voltage until the control amplifier can respond to bring it back to normal. This effect can be especially troublesome where substantially less than full output is being used at the load since the transient overshoot in this case can be substantial and even dangerous to sensitive devices being powered.

The turn-off overshoot may be due to the fact that when power is turned off the control amplifier again responding faster than the main power supply drops out of control permitting a surge of current to flow through the pass tube.

It has been found that a simple and effective means can be provided which contains both the turn-on and turn-off transients. Initially the pass tube (or tubes) is biassed to cut-off by means of a fixed voltage applied through a resistor to the tube grid. Also the control amplifier output is disconnected from the control grid of the tube. In addition the control amplifier is supplied with a cut-off bias such that its output calls for no output from the pass tube.

The above three conditions are controlled by a double pole double throw relay or its equivalent. One pole of the relay opens or closes the circuit between the control amplifier output and the control grid of the pass tube. The other pole applies cut-off bias to the control amplifier or removes this bias to allow the normal functioning of the control amplifier.

The relay is operated from its normally "off" position where it opens the amplifier output circuit and biasses its input circuit to its "on" position connecting the control amplifier to the grid of the pass tube and removing the input bias to the control amplifier by means of a timing module and a series connected transistor. The timing module is supplied by an auxiliary power supply while the transistor is supplied from a fast response portion of this power supply.

When the switch is thrown turning on the main and auxiliary power supplies the relay is in its "off" position, cut-off biasis applied to the pass tube and to the control amplifier. The tube heater starts to heat the tube cathode. In the mean time the fast acting portion of the auxiliary power supply energizes the transistor which is in series with the relay coil making it ready to switch. The balance of the auxiliary power supply energizes the timing circuit the output of which causes relay to actuate the double pole double throw contacts after a predetermined delay. This delay is chosen to be sufficient to allow the tube heater to come up to operating temperature. At the end of the delay period the relay contacts are switched closing the circuit between the output of the control amplifier and the pass tube control grid and removing the cut-off bias from the input of the control amplifier. Now the amplifier output can start to rise turning on the pass tube to the point of control and thereby bring the output of the power supply up to its proper operating point.

Turning the power off to the power supplies results in first, the fast acting portion of the auxiliary power supply quickly drops the operating voltage to the transistor in series with the relay causing the relay to switch to its "off" position, thereby opening the circuit between the control amplifier and the pass tube grid and reconnecting the cut-off voltage to the input of the control amplifier. The pass tube is thus returned to cut-off and the control amplifier is cut-off.

In this manner both turn-on and turn-off transients are effectively eliminated.

In the drawing:

FIGS. 3 and 4 are graphic representations of the various time intervals involved in the invention.

Figure 1:
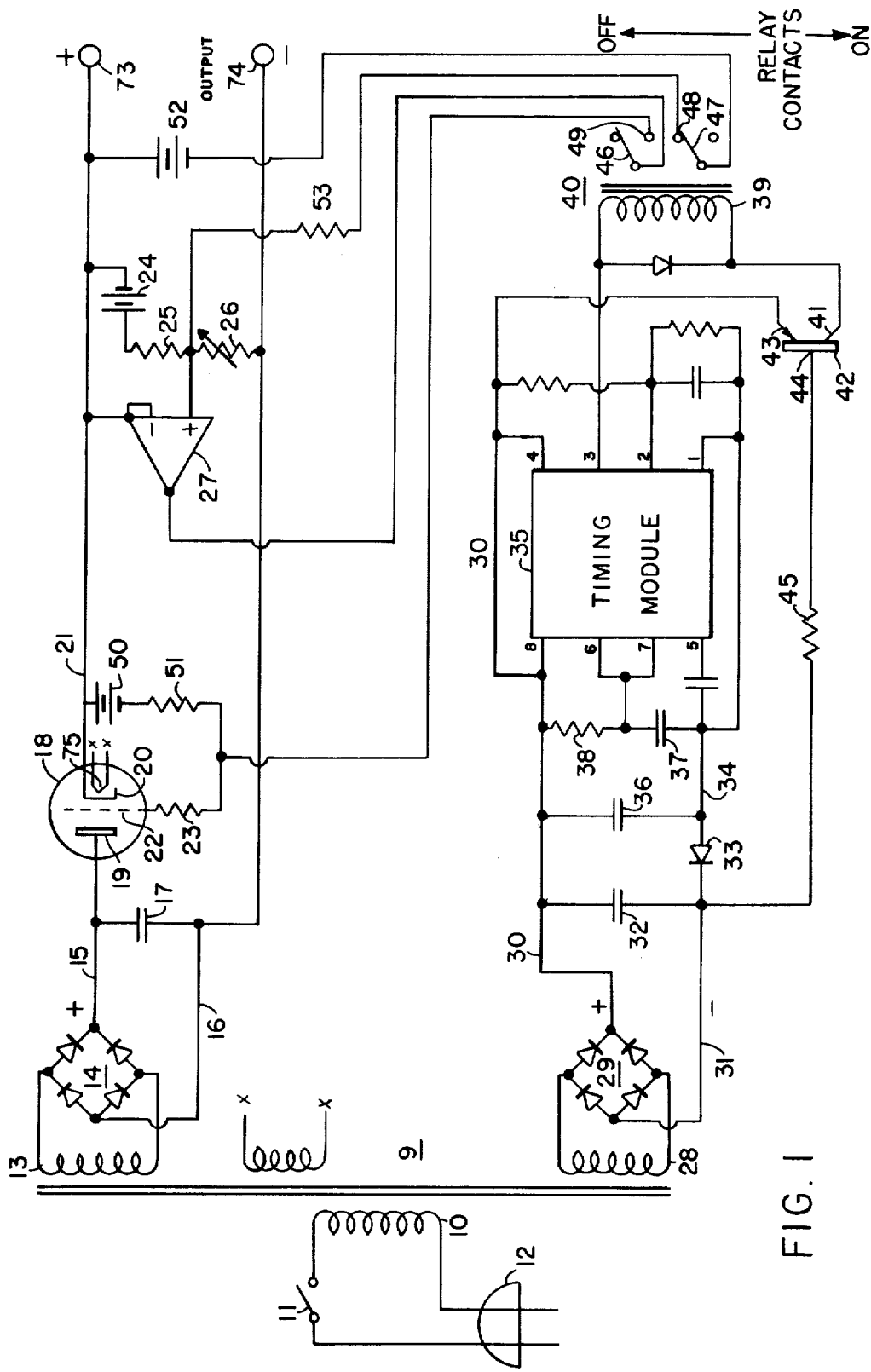
FIG. 1 is a schematic circuit diagram of one form of the invention.

FIG. 1 shows a line transformer 9 having a primary 10 connected to an on-off swtich 11 and line plug 12. A first secondary 13 is connected to a rectifier bridge 14 the dc side of which is connected to positive line 15 and negative line 16 across which is connected filter capacitor 17. A series pass device in the form of vacuum tube 18 includes plate 19 connected to positive line 15; cathode 20, heated by conventional means not shown, connected to output positive line 21 and control grid 22 connected to one end of current limiting resistor 23. A variable output voltage feedback control circuit is bridged across output positive line 21 and negative line 16, comprising reference voltage source 24, reference resistor 25, variable output voltage control resistor 26 and control amplifier 27. If the output of control amplifier 27 were connected to the end of resistor 23 remoted from grid 22, the system described so far would operate as a conventional bridge controlled power supply with a series pass tube. The balance of the description of FIG. 1 comprises circuits for eliminating turn-on and turn-off transients in such a power supply.

At the instant the power line switch 11 is closed turning on the ac power source, transformer secondary 28 is energized and bridge rectifier 29 applies direct current to positive line 30 and negative line 31 across capacitor 32. Capacitor 32 is chosen to have a relatively low capacitance so that it charges and discharges quickly for reasons that will be apparent from the description below. The dc voltage developed across capacitor 32 is applied through diode 33 across capacitor 36 and to negative line 34. The voltage between positive line 30 and negative line 34 is applied to power timing module 35. This timing module is shown as a conventional device popularly known as a - 555 and the numerals 1 through 8 are the pin numbers generally used on these units. A timing circuit consisting of capacitor 37 and resistor 38 is connected across line 30 and 34 and to pin 6. A coil 39 of relay 40 is connected between output terminal 3 and collector 41 of transistor 42. Emitter 43 is returned to positive line 30 and base 44 is connected through current limiting resistor 45 to negative line 31. As long as output terminal 3 is high (positive) relay 40 will not be energized but when terminal 3 goes low (negative), relay 40 will be energized by current flowing through transistor 42. When relay 42 is deenergized, arm 46 is removed from contact 49 and grid 22 of tube 18 is biassed out of conduction by means of the negative voltage 50 applied through current limiting resistor 51. Also arm 47 completes a circuit to contact 48 applying a cut-off bias from voltage source 52 through current limiting resistor 53 to the input of control amplifier 27.

When power is initially applied to the power supply by closing primary switch 11, relay 40 is deenergized and tube 18 and amplifier 27 are cut-off as described just above. This allows the heater, not shown, of tube 18 to bring the cathode up to operating temperature while the tube is cut-off and during this same time holds amplifier 27 cut-off so that no transients can be generated before final operating conditions can be established. Relay 40 remains deenergized as long as output terminal 3 remains high. It is initially high at turn-on and remains high until capacitor 37 charges to the point which will make the circuits connected to terminal 6 switch output 3 to low. When this latter happens, current flows through transistor 42 and relay coil 39 causing arm 46 to close to contact 49 connecting the output of amplifier 27 to tube control grid 22 and arm 47 to open contact 48 allowing the input circuits of amplifier 27 to function to establish regulation of the output voltage of the power supply. It has been found that in this way regulation is established after turning on the power supply with substantially no transients being produced in the power supply output across output terminals 52 and 53.

This system described above also effectively prevents turn-off transients. When line switch 11 is opened to turn off the power supply, the voltage across capacitor 32 drops relatively quickly due to the low time constant of capacitor 32 and resistor 45. These constants are chosen so that the voltage across capacitor 32 drops quickly and much faster than the voltage across capacitor 17 of the main power supply. When the voltage across capacitor 32 drops it cannot be replenished from the voltage across capacitor 36 due to reverse connected diode 33. Also, when this voltage drops, forward bias on the base 44 of transistor 42 falls and transistor 42 goes out of conduction. This latter deenergizes relay 40 and the contacts return to their initial positions placing cut-off bias on grid 22 and the input to amplifier 27. Thus, the power supply is shut down with little or no turn-off transients.

Figure 2:
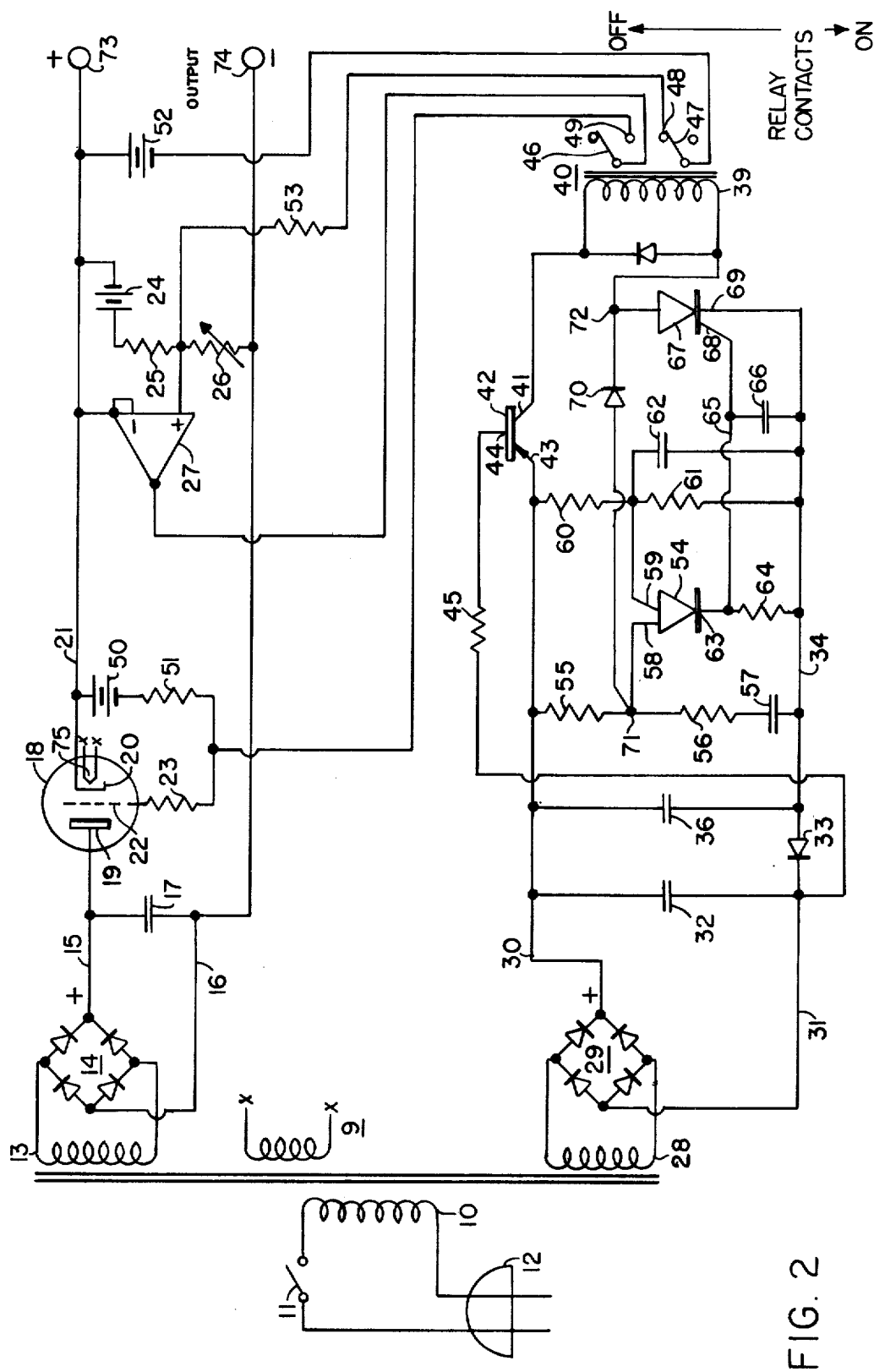
FIG. 2 is a schematic circuit diagram of the preferred form of the invention.

FIG. 2 shows the preferred form of the invention. All similarly numbered components correspond with those of FIG. 1 as described above. The results achieved with the circuit of FIG. 2 are as described above in eliminating turn-on and turn-off transients. At the instant of turn-on silicon controlled rectifier 67-68-69 is in its non-conducting state and relay 40 is deenergized thereby applying cut-off bias to both grid 22 and amplifier 27. The timing to turn on the tube and control amplifier is provided by charging capacitor 57 through resistors 55 and 56 in series. The programmable unijunction transistor (PUT) 54 is connected to a reference voltage provided at the junction between voltage divider resistors 60 and 61. When the capacitor voltage at junction 71 reaches the firing voltage determined by this reference voltage, the PUT transistor 54 conducts. The resulting current flowing through resistor 64 being placed across cathode 69 to gate 68 of silicon controlled rectifier 67-68-69 causes it to fire pulling down the voltage across relay coil 39 and causing the relay contacts to switch to their lower (ON) positions thereby activating the power supply regulator including amplifier 27 and pass tube 18.

On turnoff the circuit operates as described above with transistor 42 becoming non-conducting thereby causing the relay to drop out (OFF). Diode 70 is provided to discharge timing capacitor 57 on turn-off. When transistor 42 ceases to conduct, current to silicon controlled rectifier 67-68-69 is turned off causing it to return to its initial non-conducting state.

FIG. 3 illustrates the operation of the preferred form of the invention in graphical form. The vertical axes represent voltage or temperature while the horizontal axis represents time after the instant of turn-on. Curve A shows how the temperature of the cathode 20 of tube 18 rises after turn-on until after about 30 seconds at C it has reached its rated operating temperature and holds steady. The potential of terminal 72 of the time delay circuit (FIG. 2) is represented by curve B showing how terminal 72 starts high and at the end of 30 seconds goes low energizing relay 40 and causing the relay contacts to operate during the circuit in operating condition.

In FIG. 4 curve D shows how the current to transistor 42 and hence to relay 40 decays quickly after turn-off while curve E shows how the power supply output voltage decays more slowly. These curves illustrate how relay 40 operates on turn-on only after tube 18 is ready for normal control functioning and how it drops out on turn-off before other voltages in the system can drop to where proper control is lost.

While two forms, including the preferred form of the invention have been shown and described, other forms and modifications are possible within the spirit and scope of the invention as set forth, in particular, in the appended claims.

I claim:

1. In a voltage regulated power supply including a thermionic vacuum tube pass device and a control amplifier for controlling the conduction of the pass tube for controlling the output voltage of the power supply, circuit means for substantially eliminating turn-on and turn-off transients including the combination of;

means for rendering said tube substantially non-conducting;

means for rendering said control amplifier substantially non-responsive to error signals;

means for turning on the power supply;

timing means adapted to start timing at the instant said turn-on means is actuated;

said timing means including means for disabling said means for rendering said tube non-conducting and said means for rendering said control amplifier non-responsive at the end of a predetermined interval of time;

and thereby permitting normal operation of said pass tube and control amplifier to control the output voltage of said power supply;

and means acting upon turn-off of said power supply for ending the action of said disabling means to restore non-conductivity to said tube and non-responsiveness to said amplifier at a time short compared to said predetermined time after the instant of turn-off on said power supply.

2. In a voltage regulated power supply including a thermionic vacuum tube pass device and a control amplifier for controlling the conduction of said pass tube for controlling the output voltage of the power supply, circuit means for substantially eliminating turn-on and turn-off transients including, the combination of;

a source of cut-off bias coupled to the control grid of said vacuum tube;

a source of cut-off bias coupled to the input of said control amplifier;

relay operated switch means for coupling the output of said control amplifier to the control grid of said vacuum tube and switch means for opening the coupling between said source of amplifier cut-off bias and the input to said amplifier;

means for holding said relay operated switches off for a predetermined time after turn-on of said power supply and for releasing said relay operated switches after a period of time short compared with said predetermined time after turn-off of said power supply.

3. In a voltage regulated power supply including a bias signal controllable series pass device and a control amplifier for controlling said series pass device for controlling the output voltage of the power supply, circuit means for substantially eliminating turn-on and turn-off transients including, the combination of;

first bias means coupled to control said pass device to render said pass device substantially non-conducting at the instant of turn-on of said power supply;

second bias means coupled to the input of said control amplifier to render said amplifier substantially non-responsive to control signals at the instant of turn-on of said power supply;

timing means adapted to start a first timing interval at the instant of turn-on of said power supply for operating switching means at the end of said interval;

wherein said switching means is connected to bypass said first bias means by connecting the output of said control amplifier to the control means of said pass device and to open the coupling of the second bias means to permit said amplifier to assume control of the output of said power supply;

and further circuit means for returning said switching means to its initial condition as at the instant of turn-on at a time after turn-off of the power supply which is short compared to the decay time of unregulated voltages in said power supply.

4. In a voltage regulated power supply including a thermionic vacuum tube pass device and a control amplifier for controlling the conduction of the pass tube for in turn controlling the output voltage of the power supply, circuit means for substantially eliminating turn-on and turn-off transients including, the combination of;

first means for rendering said pass tube non-conducting;

second means for disabling said control amplifier;

means for activating said first and second means for a predetermined interval of time after turning on said power supply;

and means for activating said first and second means upon turning off said power supply for substantially eliminating turn-on and turn-off transients.

* * * * *